United States Patent [19]

Schubert

[11] Patent Number: 4,567,866
[45] Date of Patent: Feb. 4, 1986

[54] PISTON CRANKSHAFT INTERFACE

[76] Inventor: Hans Schubert, 925 Alma St., Palo Alto, Calif. 94301

[21] Appl. No.: 686,455

[22] Filed: Dec. 26, 1984

[51] Int. Cl.$^4$ ............................................. F02B 75/30
[52] U.S. Cl. .............................. 123/197 R; 74/579 R
[58] Field of Search ........ 123/197 AB, 197 A, 197 R; 74/579 R, 579 E, 579 F, 593

[56]  References Cited

U.S. PATENT DOCUMENTS

| | | | |
|---|---|---|---|
| 213,880 | 12/1923 | Frandsen | 123/197 R |
| 1,379,115 | 5/1921 | Mallory | 123/197 A |
| 1,569,582 | 1/1926 | Scott | 123/197 R |
| 2,043,518 | 6/1936 | Rice et al. | 123/197 A |
| 3,034,362 | 5/1962 | Caddell | 123/197 AB |
| 3,908,623 | 9/1975 | McWhorter | 123/197 A |
| 4,203,406 | 5/1980 | Smith | 123/197 A |

Primary Examiner—Magdalen Y. C. Moy
Assistant Examiner—David A. Okonsky
Attorney, Agent, or Firm—Paul F. Schenck

[57]  ABSTRACT

An internal combustion engine with extended power stroke and shortened compression stroke has an improved efficiency over internal combustion engines having strokes of equal length.

1 Claim, 7 Drawing Figures

FIG._1.
FIG._6.
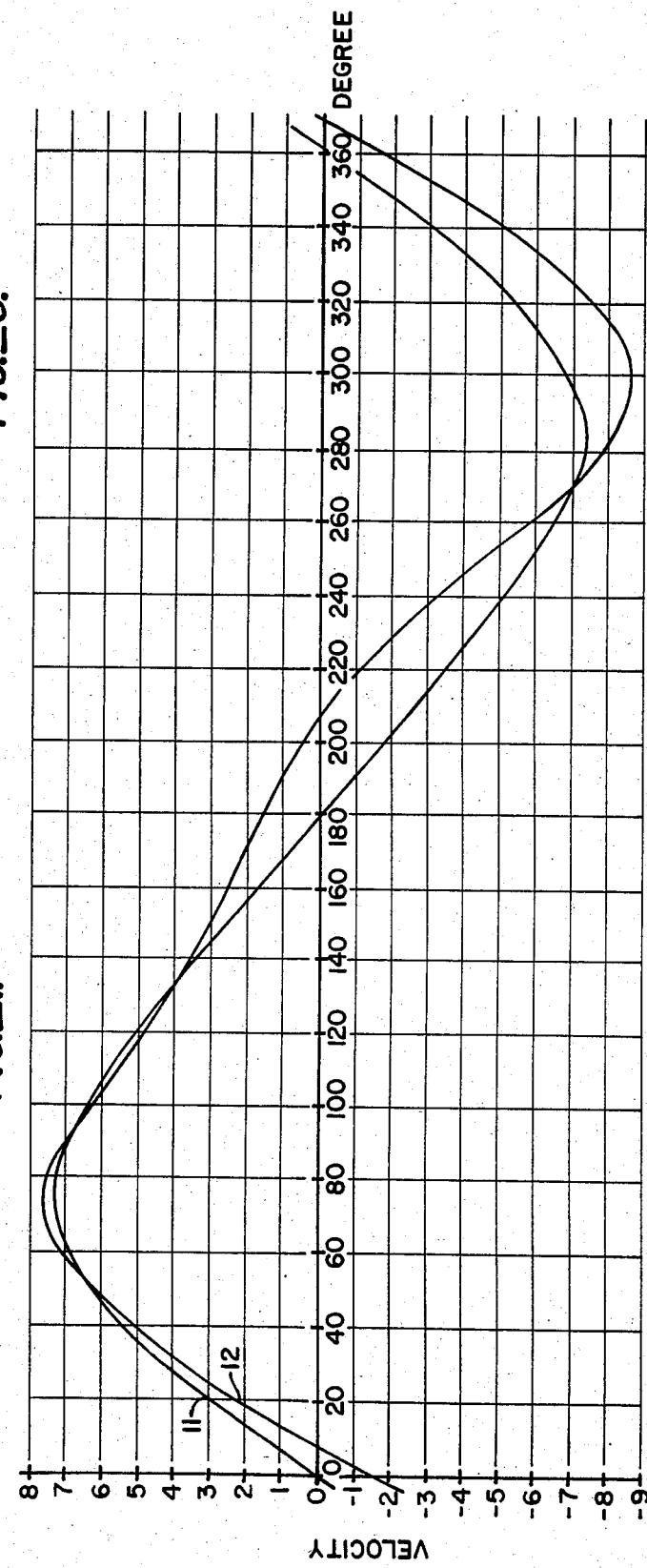
FIG._2.

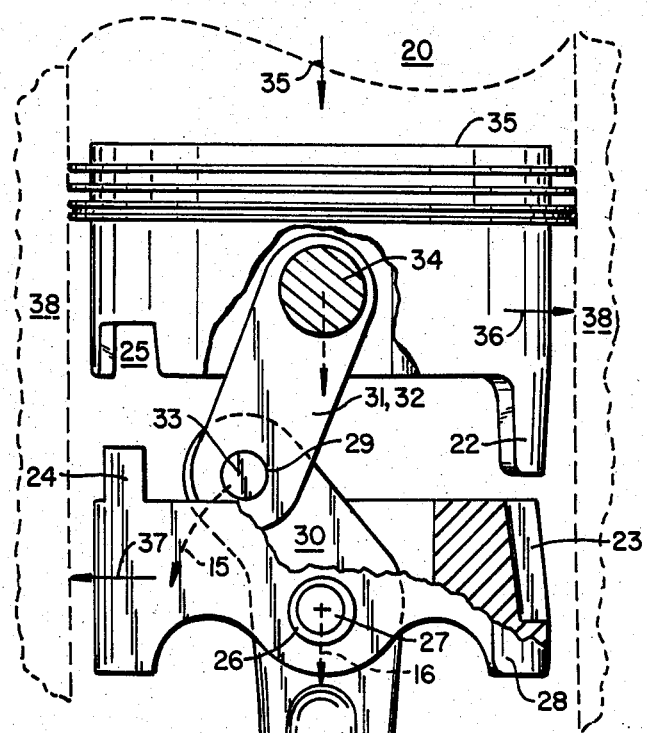
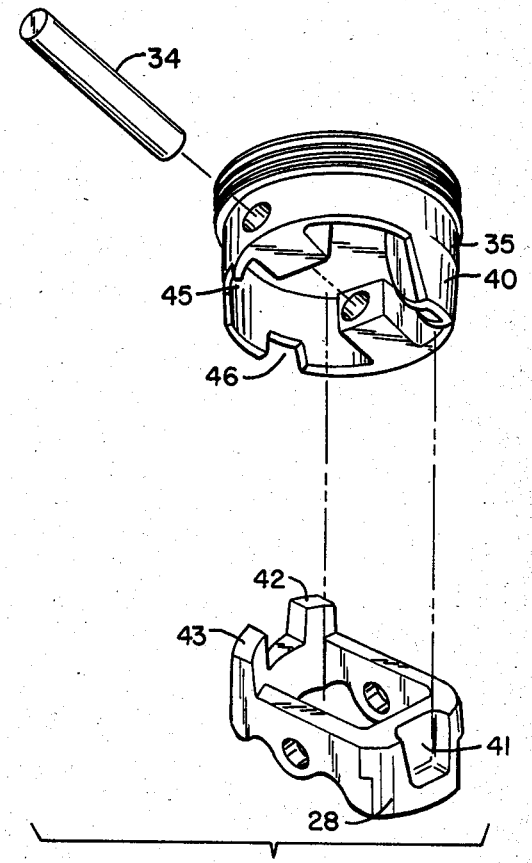
FIG._4.
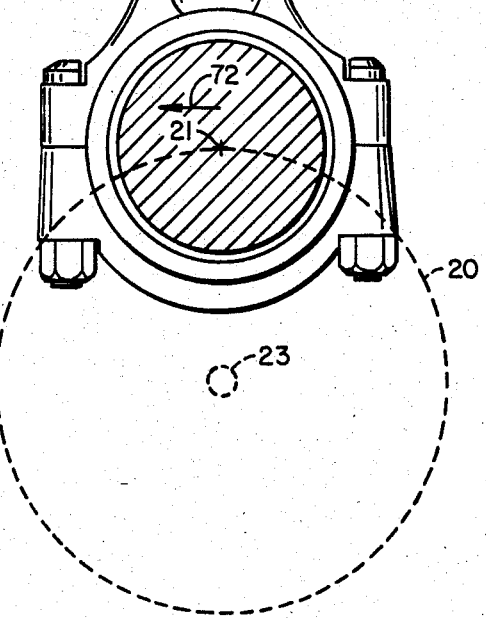
FIG._3.

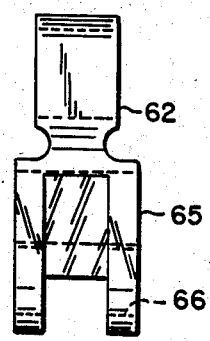
FIG._5A.
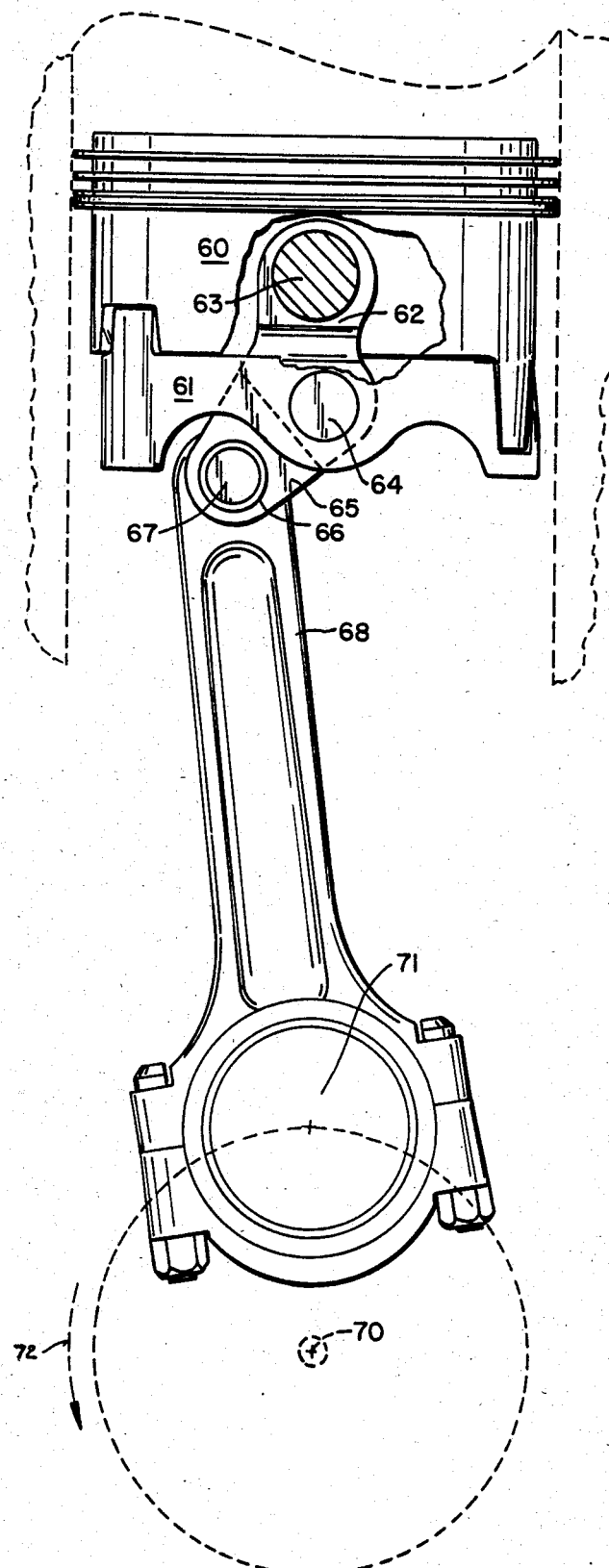
FIG._5.

PISTON CRANKSHAFT INTERFACE

BACKGROUND OF THE INVENTION

The invention relates to internal combustion engines. In internal combustion engines of traditional construction the movement of the piston in the cylinder is linked to the rotation of the crankshaft so that the piston moves between upper and lower dead center while the crankshaft rotates 180 degrees. Power stroke and compression stroke are substantially of equal length.

FEATURES OF THE INVENTION

It is a feature of this invention to improve efficiency of internal combustion engines.

It is another feature of the invention to increase mean effective pressure without increasing compression ratio.

It is another feature of this invention to extend timewise the high combustion pressure on the crank pin.

It is another feature of this invention to extend the power stroke for higher output of the engine.

It is still another feature of this invention to provide for improvement of existing internal combustion engines by use of a modified crankshaft piston interface.

SUMMARY OF THE INVENTION

In an internal combustion engine of conventional design the piston moves between the upper dead center and the lower dead center while the crankshaft rotates by 180 degrees. As soon as the piston passes through upper dead center during a power stroke its velocity allows for a rather fast expansion of the burning fuel mixture. By reducing the piston velocity at the beginning of the power stroke the output of the engine is increased.

During the compression stroke the velocity of the piston is increased resulting in a higher pressure at the beginning of the power stroke. The improved piston crankshaft interface of the present invention extends the power stroke to more than 180 degrees of rotation of the crankshaft. There is a corresponding reduction of the compression stroke to less than 180 degrees of rotation of the crankshaft.

BRIEF DESCRIPTION OF THE DRAWINGS

FIGS. 1 through 6 are presented as part of the specification. FIG. 1 is a schematic illustration of the first embodiment of the piston crankshaft interface.

FIG. 2 is a graphic representation of the velocity profile of the piston of an engine with conventional connecting rod, and of a piston linked with the crankshaft by a piston crankshaft interface of the present invention, first embodiment.

FIG. 3 is an illustration of the piston crankshaft interface, first embodiment.

FIG. 4 is an illustration of the piston and the guide of the piston crankshaft interface, first embodiment.

FIGS. 5 and 5A are illustrations of the second embodiment of the present invention.

FIG. 6 is a schematic illustration of the second embodiment of the present invention.

DESCRIPTION OF THE INVENTION

FIG. 1 is a schematic illustration of the first embodiment of the present invention. It illustrates the operation of the new piston crankshaft interface. Crankshaft 1 rotates around its longitudinal axis. A crankpin 5 of crankshaft 1 moves on a circle 2 around the axis of rotation of crankshaft 1. A rod 3 having an extension 4 is linked to crankpin 5. Furthermore, connecting rod 3 is linked to a sliding guide 6. The end of extension 4 is linked to a linking rod 7, which in turn is connected to piston 8. While crankshaft 1 rotates around its longitudinal axis in the direction as indicated by arrow 9 guide 6 moves inside the cylinder 10 up and down. The movement of guide 6 is determined by the rotational movement of crankpin 5. The movement of piston 8 in cylinder 10 depends on the length of extension 4, length of the linking rod 7 and the angle between the extension 4 and rod 3. At the time crankpin 5 passes through upper dead center, 0 degree position of crankshaft 1, sliding guide 6 passes through upper dead center. However, piston 8 has not yet completed its movement away from crankshaft 1. Some time after sliding guide 6 has passed through upper dead center piston 8 reaches its upper dead center position. The speed with which piston 8 moves during the following stroke towards its lower dead center position is lower than the speed of sliding guide 6. At the time crankpin 5 reaches lower dead center position, 180 degree position of crankshaft 1, piston 8 is still moving towards its lower dead center position. Piston 8 reaches its lower dead center position after crankshaft 1 passed through its 180 degree position, at a time sliding guide 6 moves already away from its lower dead center position towards its upper dead center position. Power stroke and intake stroke extend over more than 180 degree of rotation of crankshaft 1. During the compression stroke which starts after piston 8 passed through its lower dead center position piston 8 moves towards its upper dead center position with a velocity which is higher than the velocity of sliding guide 6. Compression occurs faster than in a conventional engine with equivalent dimensions. While piston 8 moves from lower dead center position to its upper dead center position crankshaft 1 rotates less than 180 degrees.

FIG. 2 is a graphic representation of the velocity profiles of a conventional internal combustion engine and an engine with a crankshaft piston interface of the present invention. Curve 11 represents the velocity of a piston of an internal combustion engine having a conventional connecting rod linking piston and crankshaft. Curve 12 represents the velocity of the piston of an internal combustion engine using a piston crankshaft interface of the present invention, embodiment 1. Curve 11 has zero velocity cross-over points at 0/360 degree and at 180 degree position of the crankshaft. Curve 12 is based on a piston crankshaft interface with an extension of 26 millimeter length, an angle of 30 degree between the extension and the main axis of the rod, and a throw of about 80 millimeters. Curve 12 illustrates that with the above parameters the piston passes through upper dead center while the crankshaft reaches a 10 degree after top dead center position. The power stroke extends over 200 degrees of rotation of the crankshaft and ends when the crankshaft reaches its 210 degree position.

The second halves of curves 11 and 12 relate to the piston movement from lower dead center to upper dead center positions, which includes the exhaust and the compression strokes. In an engine of traditional design the compression stroke starts when the crankshaft passes through its 180 degree position. The compression stroke of an engine with the piston crankshaft interface of the present invention starts when the piston passes through its lower dead center position, at which time the crankshaft passes through its 210 degree position. The compression stroke ends at the time the piston reaches its upper dead center position, at which time the crankshaft passes through its 10 degree position. The compression stroke equals timewise a 160 degree rotation of the crankshaft. The piston moves from lower dead center position to upper dead center position at a higher velocity than in an engine of equivalent traditional design.

FIG. 3 is an illustration of the piston crankshaft interface, first embodiment. Dashed circle 20 indicates the circle on which the center of crankpin 21 of the crankshaft is moving while the engine is in operation. lower end of main rod 25 connects main rod 25 with crankpin 21. Along the longitudinal axis of main rod 25 there is a second bearing 26. A pin 27 connects main rod 25 with sliding guide 28. A third bearing 29 is located at the end of extension 30 of main rod 25. Two linking members 31 and 32 and pin 33 connect wrist pin 34 and piston 35 with extension 30.

While piston 35 approaches its upper dead center position the fuel mixture is ignited. The working pressure of the burning fuel mixture imposes a force on piston 35. Linking members 31 and 32 forward this force onto connecting pin 33 of extension 30. This force generates a force 36 pressing piston 35 against the cylinder wall, and it generates a force 37 pressing sliding guide 28 in opposite direction to force 36 against cylinder wall 38. To reduce the pressure per square inch piston 35 and sliding guide 28 are assymetrical and having surface extensions.

Piston 35 has an extended gliding surface 40, for which sliding guide 28 provides a recess 41. Sliding guide 28 has extended gliding surfaces 42 and 43, for which piston 35 has recesses 45 and 46. Due to the extended power stroke and the shortened exhaust stroke the timings of the intake and exhaust valve operations are adjusted accordingly. Opening the exhaust valve has to be delayed more towards the end of the downward movement of piston 35.

FIG. 5 is an illustration of the second embodiment of the present invention. The arrangement includes a piston 60 with a wrist pin 63, a sliding guide 61 with a linking pin 64, a connecting rod 68 rotatively connected to crankpin 71 of a crankshaft having a rotational axis 70. A linkage 62 with three bearings 63, 64, and 67 connects piston 60, sliding guide 61 and connecting rod 68. Bearing 64 is located at the intersection of the two angled extensions 62 and 65. Pin 64 pivotally connects sliding guide 61 with linkage 62. Pin 67 connects connecting rod 68 with the angled off extension 65 of the linkage. The crankshaft rotates in the direction indicated by arrow 72.

In operation piston 60 reaches upper dead center after crankpin 71 passed through its upper dead center position. Piston 60 moves towards lower dead center position with a velocity profile similar to the profile of the first embodiment. Lower dead center position is reached by piston 60 after crankpin 71 past through its 180 degree position.

The improvement in efficiency is achieved by locating bearing 66, defining the upper end of connecting rod 68, off the center axis of the cylinder, reducing angle between connecting rod 68 and the center axis of the cylinder, thereby increasing the effective force imposed on crankpin 70 during the power stroke.

FIG. 6 is a schematic illustration of the mechanical arrangement of the second embodiment of the present invention. The components carry the same reference numbers as corresponding parts in FIG. 5.

What I claim is:

1. In an internal combustion engine having a crankshaft with a crank pin and performing a power stroke during an operational cycle, a piston crankshaft linkage, comprising in combination.
    a connecting rod rotatively linked with said crank pin;
    an angled unitary linking member having a first and a second extension;
    a piston having a first wrist pin for pivotally connecting said piston to said first extension;
    a sliding guide having a second wrist pin for pivotally connecting said sliding guide to said linking member at the intersection of said first and said second extension;
    said first wrist pin and said second wrist pin located in one plane substantially common with a plane passing through a central axis of said crankshaft;
    said second extension having a central axis angled away from a central axis of said first extension to a side common with said crank pin during said power stroke;
    said connecting rod pivotally connected to said second extension of said linkage.

* * * * *